Oct. 21, 1952             H. A. COOK            2,614,882
SELF-PROPELLED VEHICLE HAVING SUPERIMPOSED
NONCOLLAPSIBLE OCCUPANT COMPARTMENT
Filed June 30, 1948                                      8 Sheets—Sheet 1

INVENTOR.
HARVEY A. COOK.
BY
Geo. B. Pitts
ATTORNEY.

Oct. 21, 1952

H. A. COOK 2,614,882

SELF-PROPELLED VEHICLE HAVING SUPERIMPOSED
NONCOLLAPSIBLE OCCUPANT COMPARTMENT

Filed June 30, 1948

INVENTOR.
HARVEY A. COOK.
BY
Geo. B. Pitts
ATTORNEY.

Oct. 21, 1952     H. A. COOK     2,614,882
SELF-PROPELLED VEHICLE HAVING SUPERIMPOSED
NONCOLLAPSIBLE OCCUPANT COMPARTMENT
Filed June 30, 1948     8 Sheets-Sheet 4

INVENTOR.
HARVEY A. COOK
BY
Geo. B. Pitts
ATTORNEY.

Oct. 21, 1952 — H. A. COOK — 2,614,882
SELF-PROPELLED VEHICLE HAVING SUPERIMPOSED
NONCOLLAPSIBLE OCCUPANT COMPARTMENT
Filed June 30, 1948 — 8 Sheets-Sheet 5

INVENTOR.
HARVEY A. COOK.
BY Geo. B. Pitts
ATTORNEY.

Oct. 21, 1952 — H. A. COOK — 2,614,882
SELF-PROPELLED VEHICLE HAVING SUPERIMPOSED
NONCOLLAPSIBLE OCCUPANT COMPARTMENT
Filed June 30, 1948 — 8 Sheets-Sheet 6

INVENTOR.
HARVEY A. COOK.
BY Geo. B. Pitts
ATTORNEY.

Oct. 21, 1952

H. A. COOK 2,614,882

SELF-PROPELLED VEHICLE HAVING SUPERIMPOSED
NONCOLLAPSIBLE OCCUPANT COMPARTMENT

Filed June 30, 1948

INVENTOR.
HARVEY A. COOK.

BY
Geo. B. Pitts

ATTORNEY

Oct. 21, 1952

H. A. COOK 2,614,882

SELF-PROPELLED VEHICLE HAVING SUPERIMPOSED
NONCOLLAPSIBLE OCCUPANT COMPARTMENT

Filed June 30, 1948

INVENTOR.
HARVEY A. COOK
BY Geo. B. Pitts
ATTORNEY.

Patented Oct. 21, 1952

2,614,882

UNITED STATES PATENT OFFICE 2,614,882

SELF-PROPELLED VEHICLE HAVING SUPERIMPOSED NONCOLLAPSIBLE OCCUPANT COMPARTMENT

Harvey A. Cook, University Heights, Ohio

Application June 30, 1948, Serial No. 36,012

8 Claims. (Cl. 296—23)

This invention relates to a vehicle of the closed passenger type, particularly to a closed body forming with a passenger automobile a sectional unit the closed body section of which is removably mounted on the other section and forms therewith a unitary duplex passenger vehicle mounted on front and rear pairs of wheels, one pair of which is steerable. This form of construction enables one or more passengers to drive cross country or tour from place to place in a convenient manner with many of the problems incident to such activity entirely avoided for the reason that sleeping quarters and other facilities for the passenger or passengers are provided and the employment of a trailer is eliminated. As the removable section is fixedly related to and entirely mounted on the main section or body of the passenger automobile the entire unit occupies a minimum space when parked and on the road when the vehicle is in motion, facilitates backing and maneuvering in any direction, the vehicle engine has less weight to transport and therefore is more economical in fuel and oil consumption, and parking and driving on roads and in congested traffic conditions are materialy simplified.

One object of the invention is to provide an improved light weight closed body adapted to be detachably mounted on various conventional types of passenger vehicle having travel facilities including sleeping, dressing, eating and storage equipment usually employed in a trailer.

Another object of the invention is to provide, in a closed passenger vehicle, an improved closed body having sleeping and other equipment, detachably or removably mounted on the vehicle body.

Another object of the invention is to provide an improved passenger vehicle, the body thereof consisting of a closed main or driving section and a removable closed section containing sleeping and other equipment.

Another object of the invention is to provide an improved closed body having sleeping and other equipment adapted to be removably mounted on a standardized closed body of a passenger vehicle and forming therewith a unitary sectional structure.

Another object of the invention is to provide an improved closed body shaped to be removably mounted on the top and rearward portion of a closed passenger vehicle body and providing in its interior sleeping equipment, baggage supports, storing space while permitting acess to the rear compartment of the vehicle body.

Another object of the invention is to provide an improved closed body member adapted to be removably mounted on the top and rearward portion of a vehicle body, the walls of the body member being provided with means to effect a sealing relation with the surfaces of the vehicle body, whereby the body member affords comfortable use under various weather conditions.

Another object of the invention is to provide an improved closed body member adapted to be removably mounted on the closed body of a passenger vehicle, shaped to extend over the top and tail portion of the vehicle body to minimize the overhang rearward of the latter.

Another object of the invention is to provide an improved closed body member adapted to be removably mounted on the closed body of a vehicle and containing sleeping and other equipment and a ventilating system.

Other objects of the invention will be apparent to those skilled in the art to which my invention relates from the following description taken in connection with the accompanying drawings, wherein Fig. 1 is a side elevation of a vehicle embodying my invention, parts being broken away.

Fig. 4a is a fragmentary section of parts, enlarged.

Figure 1:
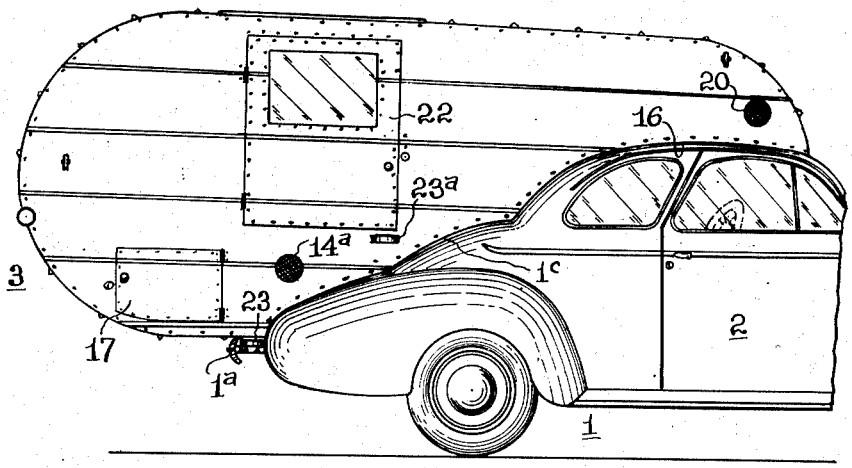
Figure 2:
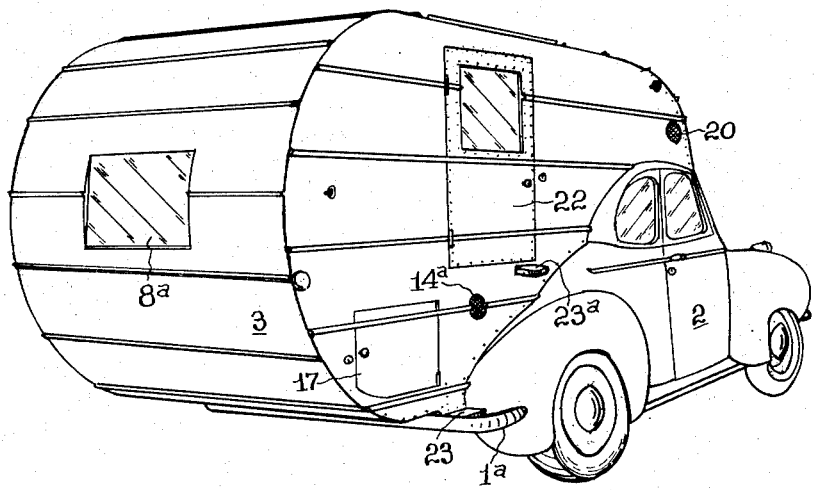
Fig. 2 is a perspective view looking at the rear of the vehicle.

In the drawings (referring particularly to Figs. 1 to 8, inclusive), 1 indicates a passenger vehicle of the coupe or club type, the chassis thereof supporting the body 2 and having a rear bumper 1a, the vehicle body top being indicated at 1b and its tail portion being indicated at 1c.

Figure 8:
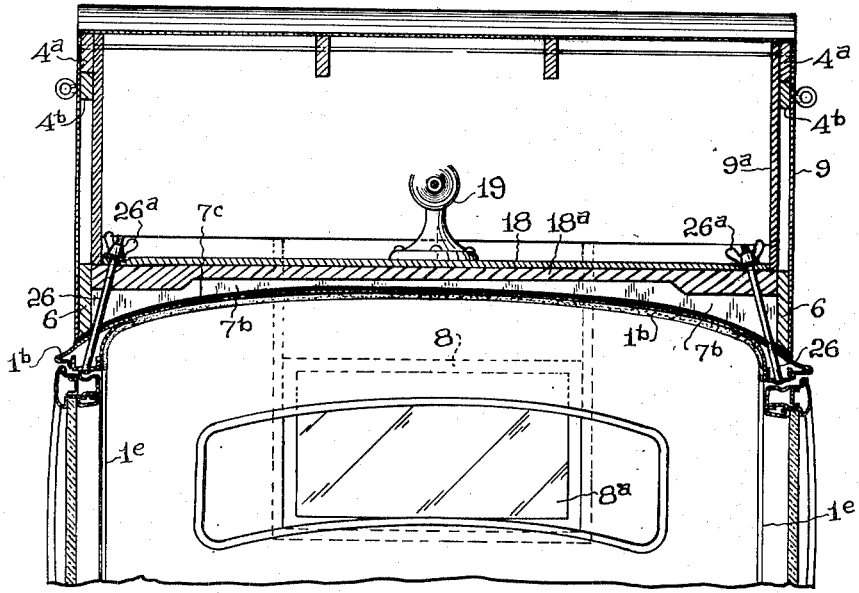
Fig. 8 is a fragmentary section on the line 8—8 of Fig. 4.

3 indicates as an entirety a closed body removably mounted on the body 2. While the body 3 overhangs the rear end of the body 2, it is entirely supported on the latter to provide a duplex body mounted on one set of wheels. The body 3 consists of a skeleton frame 4 (see Figs. 3 and 5) having upper spaced longitudinally extending members 4a and lower spaced inclined members 4b, each lower member 4b and the adjacent upper member 4a being (a) connected at their rear ends by an end member 4c, preferably of arcuate shape and (b) intermediate their ends by studding 5, 5a. The upper members are connected by cross members 5a'. The forward end portions of the lower member 4b are connected to parallelly related extension members 6 the outer ends of which are connected to the lower end of a front wall 6a. The upper end of the front wall 6a is connected to the front ends of the members 4a, 4b. The extension members 6 are connected in spaced relation by front and rear cross members 7, 7a, and intermediate members 7b, 7b'. The member 7a extends over the top 1b forward of the rear window 1d of the body 2. The lower edges of the extension members 6 and the cross members 7, 7b, 7b', are of arcuate shape and engage the top wall 1b of the body 2. As the top wall 1b is of general convex shape the engagement of the members 7a, 7b, 7b', 7, therewith serves to prevent lateral movements of the body 3 relative to the body 2. As shown in Fig. 8, I interpose between the body top 1b and inner edge of each member 7b, 7b', a strip of webbing 7c to protect the surface of the top. The members forming the frame 4 are formed of wood, which was the only material available at the time the body 3 was built; but any or all of these members may be formed of other desirable material or materials. It is to be observed that the arrangement of the frame members and their connecting means are for illustrative purposes and may be otherwise fabricated, depending on the kind and shape of material employed.

Figure 3:
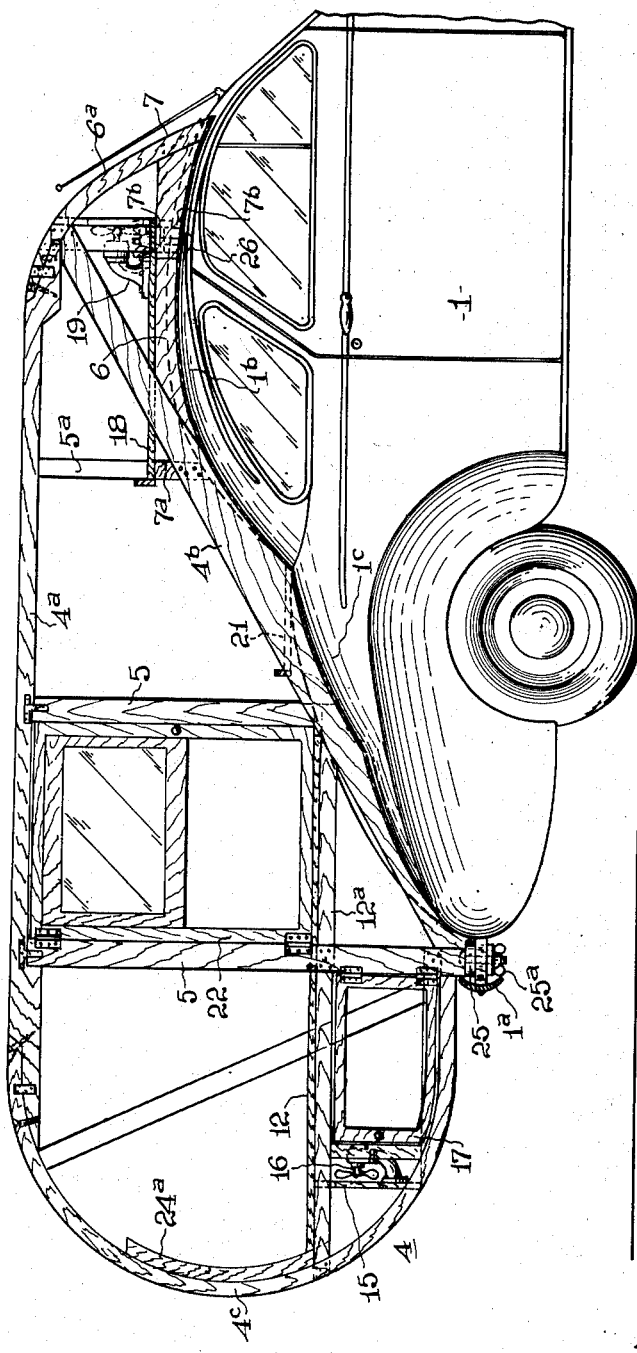
Fig. 3 is a view similar to Fig. 1, but with the side walls removed to show certain details of the frame construction.
Figure 4:
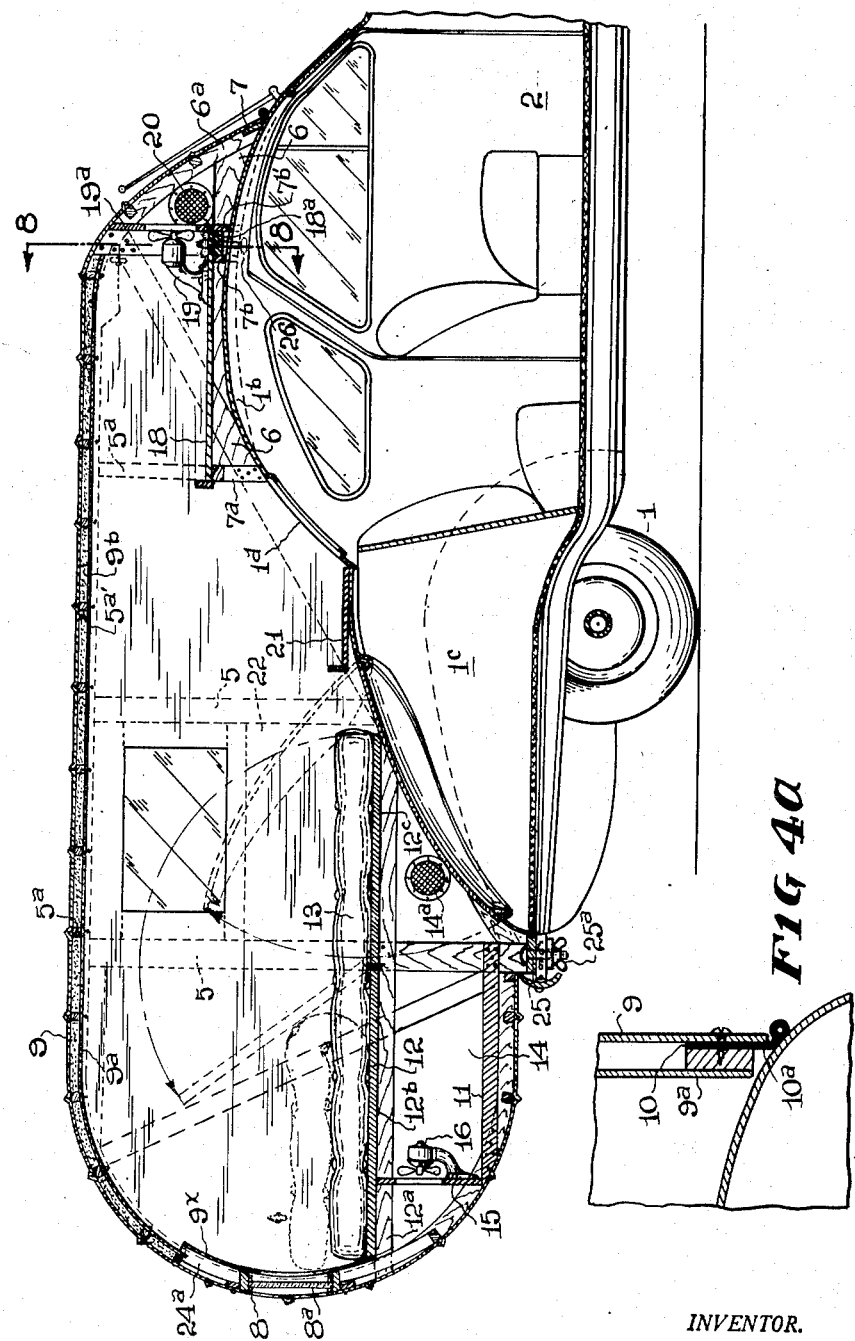
Fig. 4 is a section on the line 4—4 of Fig. 6.
Figure 5:
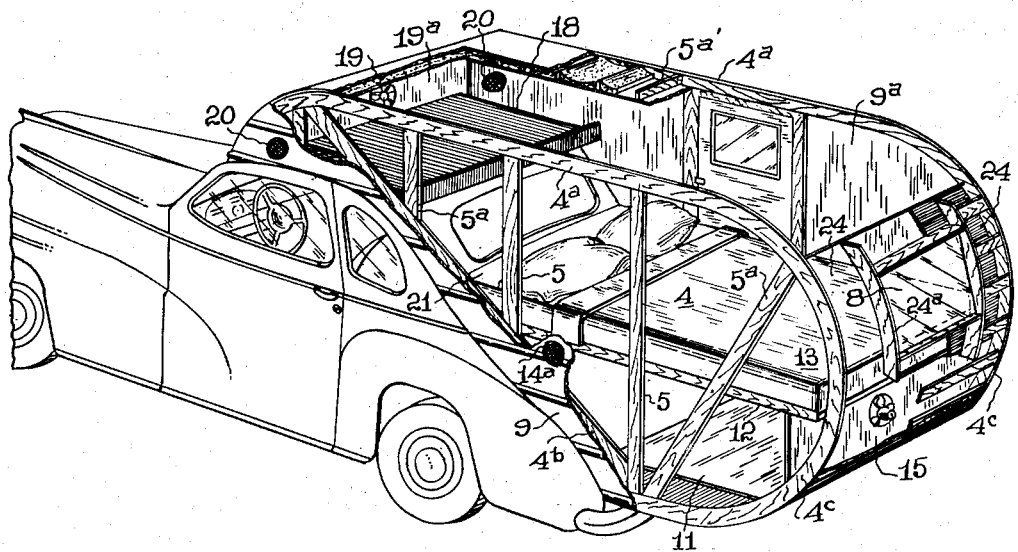
Fig. 5 is a perspective, parts being broken away.
Figure 6:
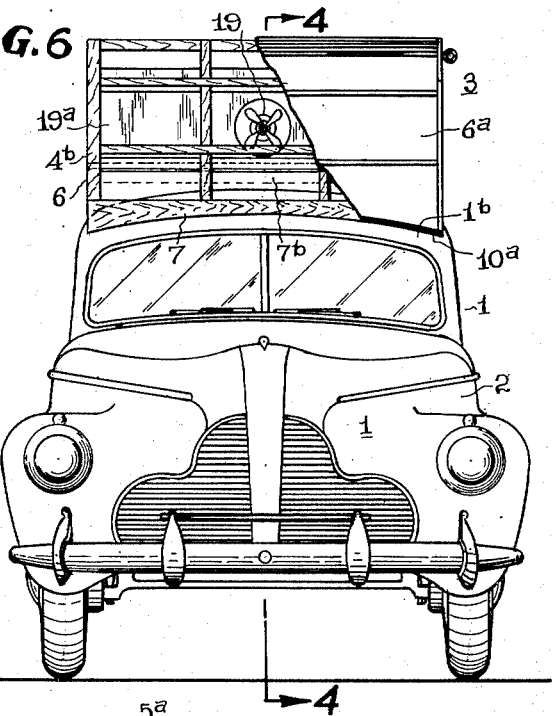
Fig. 6 is a front view of the vehicle, parts being broken away.
Figure 7:
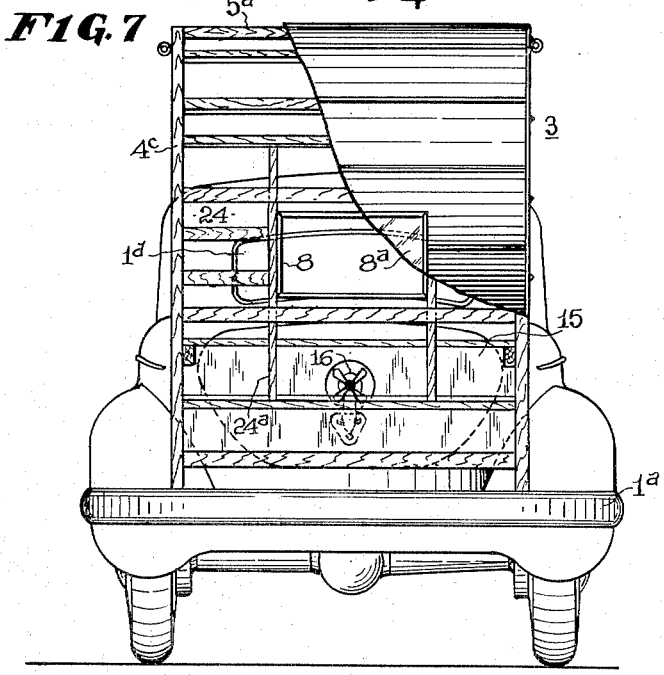
Fig. 7 is a rear view of the vehicle, parts being broken away.

As shown in Figs. 5 and 7, the related frame members between the end members 4c are arranged to provide an opening 8 in which a pane of glass 8a (see Figs. 2, 4 and 7) is mounted. As shown in Figs. 3, 4 and 6 the lower end edges of the members 4b, 6 and 7 have a shape substantially complementary to the contiguous longitudinal and transverse portions of the body 2 so that by the provision of a sealing means (later referred to) intake of the elements is prevented and the interior ventilation of the body 2 can be controlled. As shown, the lower members extend upwardly over the body top 1b and the extensions engage the latter, so that a major portion of the body 3 is superimposed on the body 2 and the overhang of the body 3 is reduced to a minimum. As shown and by preference, the outer sides of the frame members 4a, 4b, 4c, are sheathed with sheet metal 9 (preferably sections of aluminum). Between the marginal edges of the sheating 9 and the adjacent frame members 4b, 6 and 7 I provide suitable webbing 10 the outer longitudinal portion of which extends beyond the sheathing, as shown at 10a, and yieldably engages the exterior wall of the body (see Fig. 4a) to form a seal between the bodies 2, 3. As shown in Figs. 6 and 7, the body 3 has a width substantially equal to that of the body 2 to provide a maximum space in the body 3. The inner sides of the frame members, throughout that portion of the body 3 which is to be occupied, as later set forth, are also, by preference, provided with a sheathing 9a and between the sheathing 9, 9a, and the frame members I preferably provide suitable insulating material 9b (see Fig. 4). 11 indicates a horizontally disposed wall between the sides of the body 3 and extending between the lower ends of the outer studdings 5 and the adjacent lower portions of the end members 4c. The wall 11 may be utilized to support excess luggage or other articles. Above the wall 11 I provide a support 12 for a mattress 13. The support 12 is equal in width to that of the interior of the body 3 and extends from the rear end of the body 3 forwardly into overlying relation to the tail 1c; the support 12 in this arrangement is disposed at a level which provides a support for a full length size mattress 13 for occupancy by one or two passengers lying lengthwise of the vehicle 1. The support 12 is mounted on sills 12a, which are suitably connected to the end members 4c, outer studdings 5 and members 4b. The support 12 consists of an outer section 12b secured to the sills 12a and an inner section 12c hinged to the inner end of the section 12b and engaging the sills 12a. The hinged section may be swung upwardly, as shown in dotted lines in Fig. 4, to permit the door for the tail compartment to be swung open (as shown in dotted lines) and hence provide access to the storage space in the tail 1c. The support 12 forms with the tail 1c and wall 11 a chamber 14 the side walls of which are provided with screened air intakes 14a. At the cuter end of the wall 11 is a transverse partition 15 formed with an opening and supporting an electric fan 16 which draws air in through the intakes 14a and forces it into the area above the support 12 in the manner later set forth. A hinged door 17 in one side wall of the body 3 provides access to the chamber 14. 18 indicates a platform for baggage mounted on the extensions 6 and cross members 7a, 7b and 7b'. The platform 18 preferably supports an exhaust electric fan 19 forming part of the ventilating system for the body 3 and arranged to induce air flow from the occupant compartment thereof through an opening in a partition 19a and an out-take 20 in each of the side walls of the body 3. 21 indicates a transversely supported tray suitably secured at its opposite ends to the side walls of the body 3 at the inner end of the tail 1c below the rear opening 1d in the top 1b. It will be observed that the opening 1d is unobstructed and that the opening 8 is in line with the opening 1d, to give the driver in the body 2 vision rearwardly of the vehicle. If desired, the glass in the rear window 1d may be removed; in that event the driver and/or other occupant in the body 2 will have access to the tray and the tray may be used for holding various articles. Where the opening 1d is of adequate size, a person may maneuver therethrough from the body 2 to the body 3 or in the opposite direction, when desirable whether or not the vehicle is in motion or on account of weather conditions. One side wall of the body 3 is provided with a door 22, between adjacent studdings 5, the door being preferably hinged to the rear studding and protected by a drip moulding 22a. The door 22 extends from a level approximating that of the support 12 to the top wall of the body 3. A step 23 on the bumper 1a and a step 23a on the side of the body 3 or adjacent fender facilitate ingress and egress through the opening for the door. To provide for the circulation of air from the chamber 14 by the fan 16, I provide at opposite sides of the opening 8 conduits 24 formed between the opposite side walls 24a of the opening and the end members 4c. The sheathing 9 forms the outer walls for the conduits and a section of sheet metal 9x (which is formed with an opening in registry with the opening 8) forms the inner walls, the sheet metal 9x being suitably secured to the side walls 24a. As shown in Figs. 4 and 5, the walls 24a extend from the support 12 to a level thereabove.

It will therefore be seen that the fans 16 and 19 induce a flow and circulation of air which can be regulated when desired.

Figure 9:
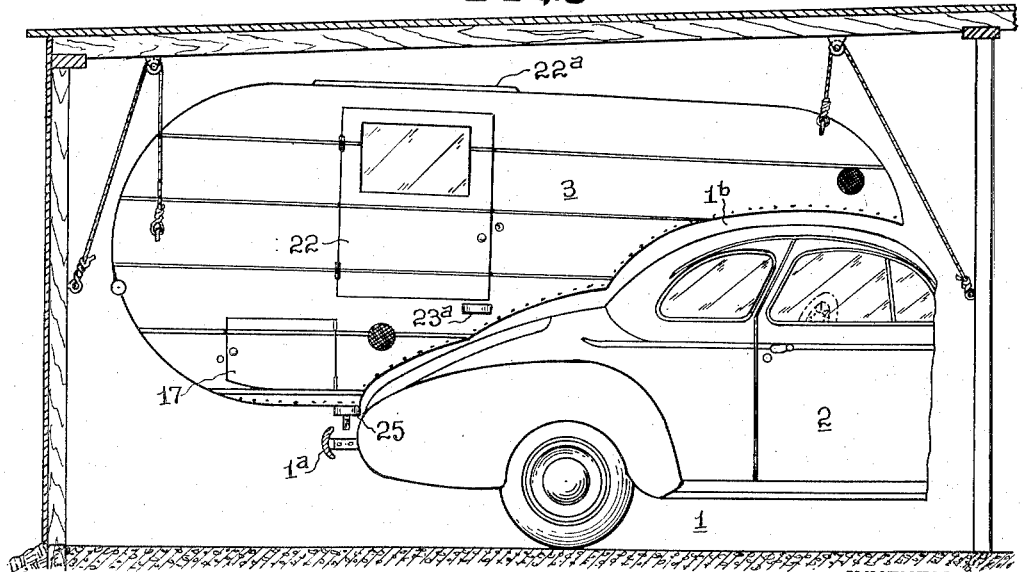
Fig. 9 is a view showing the removal of the closed compartment or section.

The body 3 is rigidly secured in position by the following means: 25 indicates a transverse base member suitably secured to the lower portion of the body adjacent the lower ends of the end members 4c and arranged to seat on the brackets for the rear bumper 1a inwardly of the latter. 25a indicates a device (such as a bolt) at each end of the base 25 and extending through the adjacent bumper bracket and a plate on the lower side of the latter, so that by means of a nut on the bolt the base member may be rigidly secured to the bracket. The front end of the body 3 is secured to the body 2 by bolts 26 (see Fig. 8) each extending through openings formed in the top wall of the opening for the door 1e, the body top 1b, a reinforcing member 18a, which is disposed between the cross members 7b, 7b', and in engagement with the platform 18, and the platform 18, the inner end portion of the bolt being engaged by a nut 26a, adapted to clamp the body 3 to the body 2. By positioning the base 25 on the bumper brackets between the bumper 1a and the rear wall of the body 2 and providing a base member equal in width to the space between the bumper 1a and body 2, shifting or jolting of the body 3 relative to the body 2 is prevented and stresses on the securing devices 25a and bolts 26 are reduced to a minimum. The securing means are not only freely accessible and easily clamped or removed, but only four elements are required to mount the body 3 in position or detach it from the body 2 and raise it from the latter for storage, a suitable raising means detachably engaging hooks 2x, as shown in Fig. 9, and at the same time permit parking of the car in a garage independently of the vehicle 1. It will be observed that the detachable securing means are of a character which does not require exterior changes in the vehicle, removal or substitution of any part thereof, or affect the exterior surface of the vehicle body 2, except the holes in the top 1b and walls of the door openings, which may be closed by bottle corks or other suitable devices.

Figure 10:
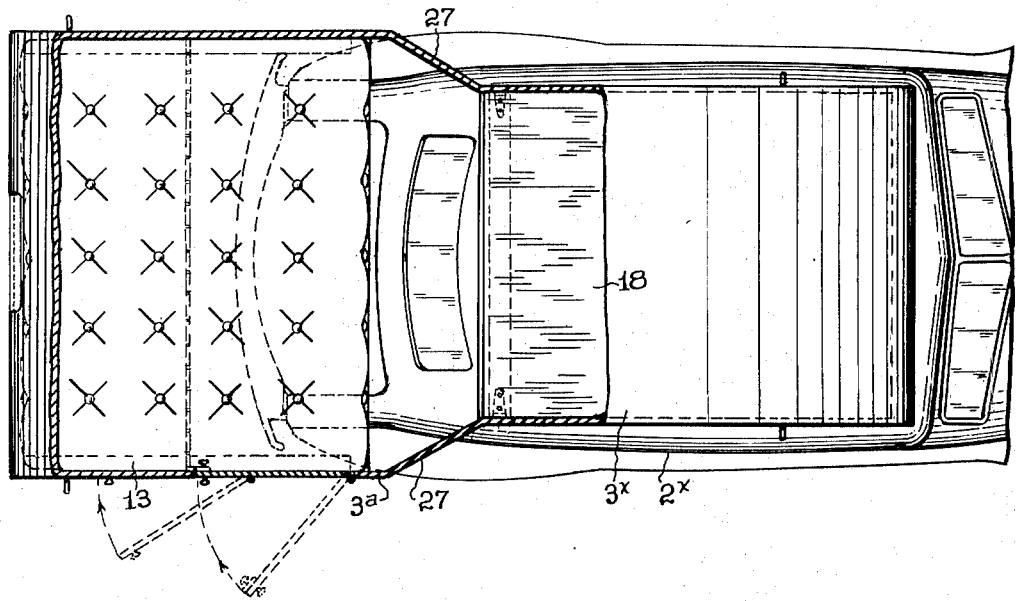
Fig. 10 is a section on the line 10—10 of Fig. 11.
Figure 11:
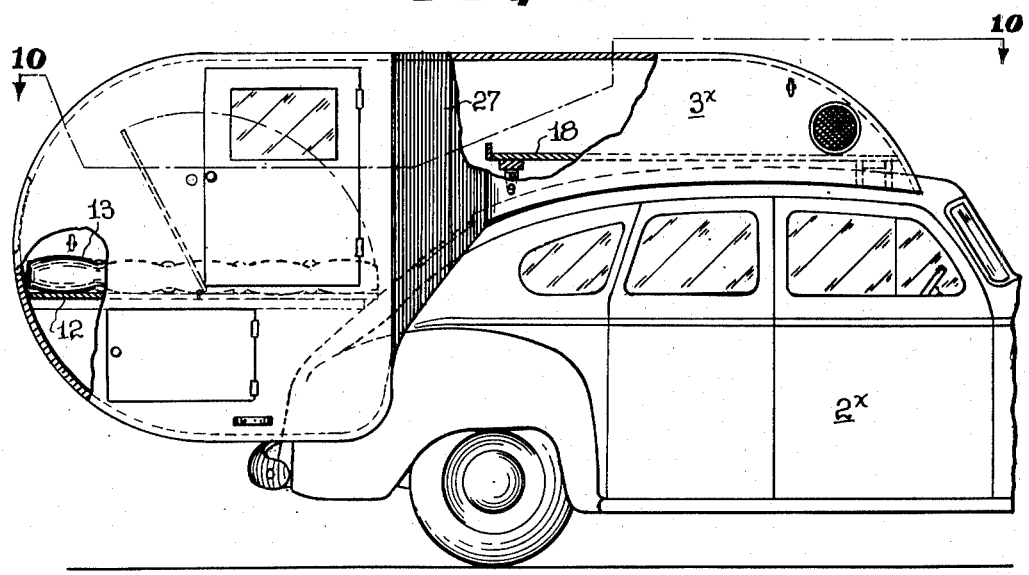
Fig. 11 shows a modified form of construction.

Figs. 10, 11, 12, 13 and 14 show the adaptation of the invention to a sedan type of body 2x. The removable body is shown at 3x. The side, top, front and rear walls of the body 3x are shown diagrammatically, as they may be structurally fabricated in various ways, as already set forth. Due to the length of bodies of the sedan type and to prevent undue overhang at the rear of the body, the interior equipment is modified. In Figs. 10, and 11, the rear portion 3a of the body 3x is wider than its front portion, these body portions being connected by outwardly inclined walls 27. This form of body construction reduces the length of the support 12, but increases its width to accommodate transversely of the vehicle a full length mattress 13. In this arrangement, the occupant or occupants lie transversely of the body 3x. This form of construction permits the length of the platform 18 to be increased and may therefore be employed as an auxiliary support for bedding to accommodate another person.

Figure 14:
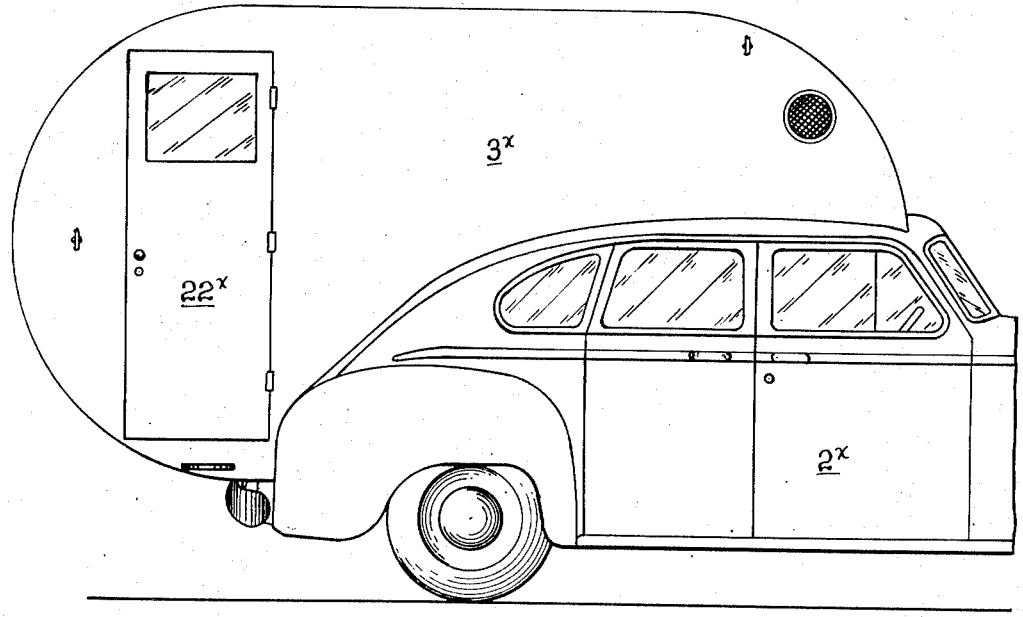
Fig. 14 shows an exterior view of a modified form of construction shown in Fig. 13.
Figure 12:
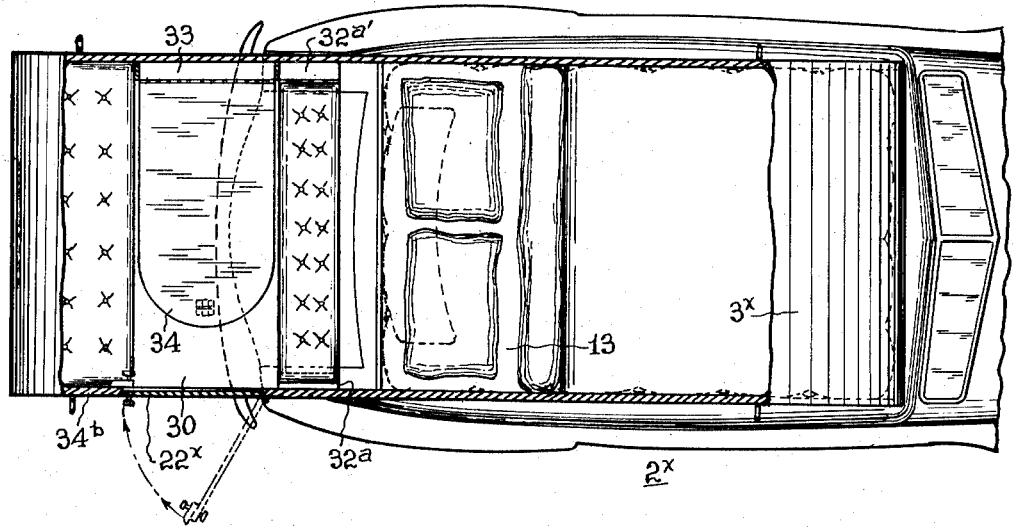
Fig. 12 is a section on the line 12—12 of Fig. 13.
Figure 13:
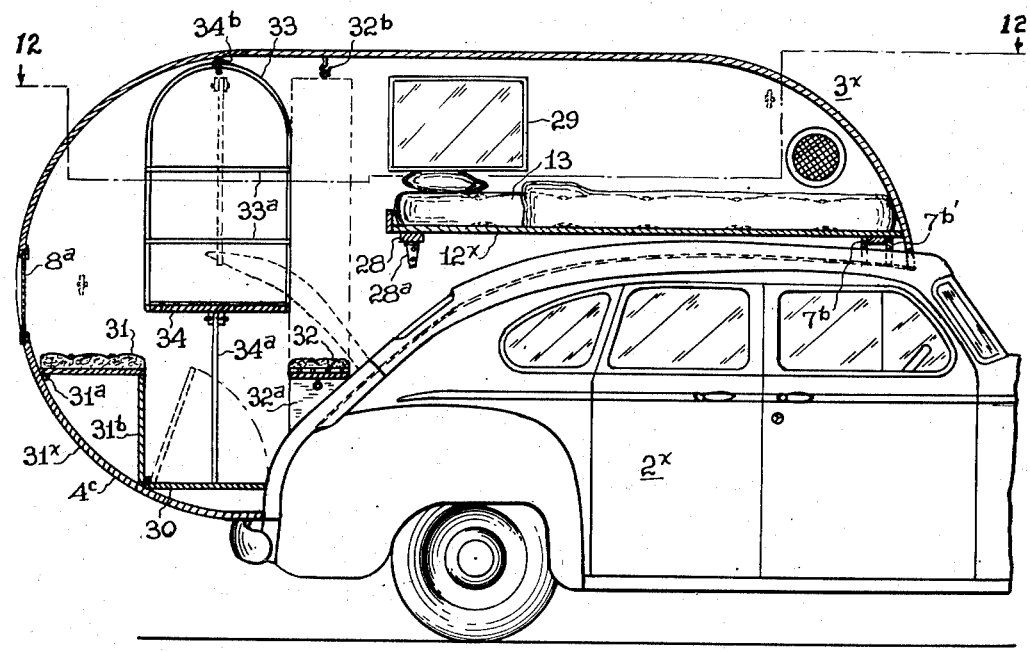
Fig. 13 shows another modified form of construction.

In Figs. 12, 13 and 14 the support 12x for the mattress 13 is mounted at its front end on the cross members 7b, 7b', and at its rear end on a transverse sill 28 supported at its opposite ends on brackets 28a. The support 12x is of a length longitudinally of the vehicle to mount a full length mattress 13. In this arrangement, the heighth of the body 3x is preferably increased to give head room above the support 12x. Either or both side walls of the body 3x may be provided with a window 29. Within the rear portion of the body 3x I provide a flooring 30 extending between the side walls of the body and providing a flooring between the front and rear seats 31, 32. The flooring 30 is hinged along its rear end and swingable upwardly, as shown in dotted lines, to permit opening of the door for the compartment in the rear of the vehicle 2x. As shown, the overhang of the body 2x and its mounting on the bumper brackets, as already set forth, is advantageously utilized as the flooring 30 may be positioned at a level which provides head room below the top 30a and between seats and hence retiring at night and re-robing in the morning is facilitated. In this form of construction the door 22x, which provides ingress and egress, extends from the flooring 30 to the top wall of the body 3x. The seat 31 is hinged at 31a to the rear wall 4c and cooperates with a vertical wall 31b to provide an accessible storage space 31x. That end of the seat 32 adjacent the door 22x rests on a ledge 32a fixed to the side wall of the body; the opposite end of the seat 32 is hinged to a bracket 32a' carried by the other side wall and swings upwardly into engagement therewith and secured in its non-use position by detachably related devices 32b. The seat 32 may be used as a support to facilitate getting into bed and back therefrom. The side wall opposite the door 22x is provided with a cupboard 33, the shelves 33a of which are adapted to support edibles and eating equipment. The cupboard is closed by a board 34, hinged along its lower end to the bottom wall of the cupboard to permit it to swing to the position shown in relation to the seats 31, 32, and serve as a table. The outer side of the board 34 is provided with a pivoted leg 34a. The board 34 is held in its up position by a suitable latch 34b.

Current for the fan motors and electric bulbs may be supplied by batteries (not shown) or the battery mounted on the vehicle chassis. When the vehicle is parked on a lot provided with electric supply equipment, these electric devices may be connected therewith.

It will be observed that I provide a vehicle having a body consisting of two closed sections, one usuable for driving and the other usable for resting and privacy, and mounted on pairs of front and rear wheels, one pair of which is driven, one pair being steerable. Thus it will be observed that the vehicle may be advantageously employed for overnight trips and trips of longer duration, conveniently and economically.

It will also be observed that the removable section terminates at its front end on the top of the main section inwardly of the windshield thereof, so that driving vision is not impaired; also, that the removable body section overhangs the rear of the main body section a minimum distance. As the width of removable body section is reduced as compared to that of the automobile on which it is mounted, the turning radius of the vehicle is not increased. The removable body is relatively light and when mounted in position the gross weight of the vehicle (including four passengers) is increased approximately 8% and the center of gravity of the vehicle is shifted but approximately seven inches rearwardly. It will thus be seen that the increased weight is so distributed that driving and steering of the vehicle is not unduly affected and strains and distortion on the body, chassis and running gear of the automobile are reduced to a minimum.

The construction may be advantageously used since the usable area (bed and luggage supports) of the removable section measures 150% of the usable floor area of the automobile. This increase in usable space is obtained with minimum overhang at the rear, and with less than 400 pounds increased weight.

To those skilled in the art to which my invention relates many changes in construction and widely differing embodiments and applicants of the invention will be apparent without departing from the spirit and scope thereof. My disclosures and the description herein are purely illustrative and not intended to be in any sense limiting. The construction of vehicle shown in Figs. 12, 13 and 14 forms the subject-matter of my co-pending application filed August 23, 1950, Ser. No. 181,008.

What I claim is:

1. A rigid auxiliary compartment structure for superposition on and readily demountable attachment to a conventional passenger automobile non-collapsible seating body, which body has a top and a tail portion provided with a door affording access to a storage space within such portion, said structure comprising rigid, non-collapsible front, rear, side and top walls providing an auxiliary human-occupancy compartment, the lower portions of said side and front walls being shaped to conform to the contours of said top and tail portion of said automobile body, whereby to fit snugly thereagainst and position the compartment above said top and tail portion; a flat, normally horizontally disposed member for supporting an occupant and mounted in a plane below the top of the seating body and above said storage space door, said member consisting of a rear stationary section and a front displaceable section extending over a portion of said storage-space door when the compartment is mounted on the body, said supporting member being displaceable upwardly from its normal position to afford access to said door and storage space; and means for detachably securing the auxiliary compartment structure to the automobile body.

2. An auxiliary member adapted to be demountably superpositioned on a conventional closed passenger seating body having a rigid top and a tail portion, said member being adapted to be mounted on and extend over the top and tail portion of the seating body and form therewith a human occupancy non-collapsible compartment consisting of rigid top, sides, front and rear end walls and a rigid bottom wall extending between said rear end wall and the tail portion of the seating body, the contiguous ends of said compartment walls being substantially complementary to the top and tail portion of the seating body, means for removably securing said compartment on the seating body, sealing means adapted to be positioned between and throughout contiguous portions of the ends of said front, sides and bottom walls, of said compartment and the adjacent walls of the seating body, and a horizontally disposed support for a mattress mounted on the side walls of and within said compartment above said bottom wall thereof, said support extending from the rear end wall of said compartment inwardly and forming with the side, rear, end and bottom walls of said compartment a chamber, one of said side walls of said compartment below said support being formed with an air intake and the rear wall of said compartment being provided with air circulating conduits leading from said chamber to the area above said support within said compartment.

3. An auxiliary member adapted to be demountably superpositioned on a conventional closed passenger seating body having a rigid top and a tail portion, the tail portion forming a storage space therewithin provided with a door, said member being adapted to be mounted on and extend over the top and tail portion of the seating body and form therewith a human occupancy non-collapsible compartment consisting of rigid top, sides, front and rear end walls and a rigid bottom wall extending between said rear end wall and the tail portion of the seating body, the contiguous ends of said compartment walls being substantially complementary to the top and tail portion of the seating body, means for removably securing said compartment on the seating body, sealing means adapted to be positioned between and throughout contiguous portions of the ends of said front, side and bottom walls of said compartment and the adjacent walls of the seating body, and a horizontally disposed support for a mattress mounted on the side walls of and within said compartment above said bottom wall thereof, said support extending from the rear end wall of said compartment inwardly over said tail portion and forming with the side, rear end and bottom walls of said compartment a chamber, the inner portion of said support being swingably mounted at its inner end on a transverse axis to permit opening of the door to the storage space and access to the latter and said chamber.

4. An auxiliary member adapted to be superimposed on a conventional closed, non-collapsible passenger seating body having a rigid top wall and a rigid rear wall formed with a relatively large opening, said member being adapted to be removably mounted on and extending over the top wall and rear wall of the seating body and outwardly of the latter wall, and form therewith a closed human occupancy compartment having communication through the opening in the rear wall of the seating body with the latter, whereby an occupant may move through the opening from the compartment to the seating body and in the opposite direction, said compartment consisting of rigid top, side, front and rear end walls and a bottom wall extending between the lower end of said rear end wall and the rear wall of the seating body, the contiguous ends of the side walls, front end wall and bottom wall being substantially complementary to the respective adjacent contiguous walls of the seating body, a horizontally disposed support for an occupant mounted on and between the side walls of said compartment extending inwardly from one of said end walls, and means adapted to detachably secure said compartment on the seating body.

5. A member as claimed in claim 4 wherein the occupant support in said compartment extends inwardly from the rear end wall thereof in spaced relation to said bottom wall and forming with the side, rear end and bottom walls a storage chamber, one side wall of the compartment above said support being formed with a separate opening, and a door for closing the separate opening.

6. A rigid auxiliary compartment for superpositioning on and have demountable attachment with a conventional passenger automobile seating body, which body has a top and a tail portion provided with a door affording access to a storage space within such portion, said compartment being mounted on and extending over the top and tail portion of said seating body and consisting of a top, side walls, front and rear end walls and a bottom wall extending between the lower end of said rear end wall and said tail portion, the lower ends of said side walls and front end wall being substantially complementary to the top and tail portion of said seating body, means for removably securing said compartment on said seating body, sealing means between said side walls, front end wall and bottom wall of said compartment and the adjacent walls of said seating body, and a horizontally disposed support for a mattress mounted between said side walls above said bottom wall, said support extending from said rear end wall inwardly over said tail portion and forming with said side walls, rear end wall and bottom wall a chamber, one of said side walls below said support being formed with an air intake and the rear end wall of said compartment having air circulating conduits leading from said chamber to the area above said support.

7. A rigid auxiliary compartment for superpositioning on and have demountable attachment with a conventional passenger automobile seating body, which body has a top and a tail portion provided with a door affording access to a storage space within such portion, said compartment being mounted on and extending over the top and tail portion of said seating body and outwardly of said tail portion and consisting of a top, side walls, front and rear end walls and a bottom wall extending between the lower end of said rear end wall and said tail portion, the lower ends of said side and front end walls being substantially complementary to the top and tail portions of said seating body, means for removably securing said compartment on said seating body, sealing means between said side walls, front end wall and bottom wall of said compartment and the adjacent walls of said seating body, and a horizontally disposed support for a mattress mounted between said side walls above said bottom wall, said support extending from said rear end wall inwardly over said tail portion and forming with said side walls, rear end wall and bottom wall a chamber, the inner portion of said support being swingably mounted at its inner end on a transverse axis to permit access to said storage space and said chamber.

8. A rigid auxiliary compartment for superpositioning on and have demountable attachment with a conventional passenger automobile seating body, which body has a top and rear walls, said compartment being mounted on and extending over the top and rear walls of said seating body and outwardly of the latter walls and consisting of a top, side walls, front and rear end walls and a bottom wall extending between the lower end portion of said rear wall and the rear walls of said seating body, the lower ends of said side walls and end walls of the said compartment being substantially complementary to the top and rear walls of said seating body, sealing means between said side walls, front end wall and bottom wall of said compartment and the top and rear walls of said seating body, a horizontally disposed support for a mattress for an occupant mounted on and between said side walls and extending inwardly from said rear end wall in spaced relation to said bottom wall and forming with said side, rear end and bottom walls a storage chamber, one side wall of said compartment above said support therein being formed with an opening leading into said compartment, a door for closing said opening, one side wall of said compartment below said support therein being formed with a separate opening leading into said chamber, a separate door for closing said last mentioned opening, and means for detachably securing said compartment on said seating body.

HARVEY A. COOK.

REFERENCES CITED

The following references are of record in the file of this patent:

UNITED STATES PATENTS

| Number | Name | Date |
|---|---|---|
| 1,287,924 | Eber | Dec. 17, 1918 |
| 1,420,298 | White | June 20, 1922 |
| 1,984,681 | Jackson | Dec. 18, 1934 |
| 2,007,295 | Coble | July 9, 1935 |
| 2,074,354 | Ash | Mar. 23, 1937 |
| 2,159,671 | Owen | May 23, 1939 |
| 2,173,076 | Stetson | Sept. 12, 1939 |
| 2,493,368 | Smelker | Jan. 3, 1950 |

FOREIGN PATENTS

| Number | Country | Date |
|---|---|---|
| 369,381 | Great Britain | Mar. 24, 1932 |
| 681,675 | Germany | Sept. 28, 1939 |